US011809238B2

(12) United States Patent
Adury et al.

(10) Patent No.: US 11,809,238 B2
(45) Date of Patent: Nov. 7, 2023

(54) SYSTEMS AND METHODS FOR ELECTRONIC DEVICES WITH INTEGRATED SUPPORT

(71) Applicant: Microsoft Technology Licensing, LLC, Redmond, WA (US)

(72) Inventors: Kashyap Adury, Bellevue, WA (US); Karsten Aagaard, Monroe, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 129 days.

(21) Appl. No.: 17/317,815

(22) Filed: May 11, 2021

(65) Prior Publication Data

US 2022/0365567 A1 Nov. 17, 2022

(51) Int. Cl.
*G06F 1/16* (2006.01)
*E05D 11/10* (2006.01)

(52) U.S. Cl.
CPC .......... *G06F 1/1681* (2013.01); *E05D 11/105* (2013.01)

(58) Field of Classification Search
CPC . G06F 1/1681; E05D 11/105; E05D 11/1028; Y10T 16/54029
See application file for complete search history.

(56) References Cited

U.S. PATENT DOCUMENTS

| | | | | |
|---|---|---|---|---|
| 3,178,761 A * | 4/1965 | Restaino | ................ | E05D 11/105 16/257 |
| 3,237,239 A * | 3/1966 | Rudnick | ............... | E05D 15/264 16/335 |
| 4,114,236 A * | 9/1978 | Vandervort | ........ | H04N 1/00519 220/829 |
| 4,819,299 A * | 4/1989 | Holan | ................... | E05F 1/1284 16/296 |
| 4,850,081 A * | 7/1989 | Grant | .................... | E05D 11/087 16/257 |
| 4,955,520 A * | 9/1990 | Ferguson | ................. | B41J 11/30 226/74 |
| 5,604,956 A * | 2/1997 | Grass | .................. | E05D 11/1014 16/335 |
| 5,800,028 A * | 9/1998 | Smith | ..................... | H02G 3/14 312/328 |

(Continued)

OTHER PUBLICATIONS

"International Search Report and Written Opinion Issued in PCT Application No. PCT/US2022/024150", dated Jul. 22, 2022, 12 Pages.

*Primary Examiner* — Victor D Batson
*Assistant Examiner* — Matthew J Sullivan
(74) *Attorney, Agent, or Firm* — RAY QUINNEY & NEBEKER P.C.; John O. Carpenter (57) ABSTRACT

A hinge device for supporting an electronic device includes a first portion and a second portion movable relative to the first portion with a biasing element supported by one or the first portion or the second portion. The first portion has an arcuate groove, and the second portion has an arcuate rail configured to complementarily mate with the arcuate groove and slide therein. The biasing element contacts a leading edge of the other of the first portion or second portion, and the first portion and second portion are bistable in a closed state relative to one another and an open state relative to one another based at least partially on a surface profile of the biasing element applying a radial force to the leading edge.

19 Claims, 5 Drawing Sheets

(56) References Cited

U.S. PATENT DOCUMENTS

| | | | |
|---|---|---|---|
| 5,867,871 A * | 2/1999 | Tasman | E05D 11/1014 |
| | | | 16/335 |
| 5,898,976 A * | 5/1999 | Leonardi, Sr. | E05F 1/1284 |
| | | | 150/123 |
| 6,195,839 B1 | 3/2001 | Patterson et al. | |
| 7,076,836 B1 * | 7/2006 | Butka | E05D 11/1057 |
| | | | 16/334 |
| 7,406,747 B2 * | 8/2008 | Choi | E05D 3/02 |
| | | | 16/257 |
| 7,604,142 B2 * | 10/2009 | Banik | A45D 40/221 |
| | | | 220/829 |
| 7,805,809 B2 * | 10/2010 | Salice | E05D 5/08 |
| | | | 16/335 |
| 7,966,695 B2 * | 6/2011 | Salice | E05F 1/1284 |
| | | | 16/335 |
| 8,024,839 B2 * | 9/2011 | Lewis, II | E05D 11/105 |
| | | | 16/334 |
| 8,441,791 B2 * | 5/2013 | Bohn | G06F 1/1681 |
| | | | 16/334 |
| 8,464,393 B2 * | 6/2013 | Kao | E05D 11/105 |
| | | | 16/292 |
| 8,474,099 B2 * | 7/2013 | Hung | H04M 1/0216 |
| | | | 16/257 |
| 9,152,183 B2 * | 10/2015 | Kurczewski | G06F 1/1681 |
| 9,304,549 B2 | 4/2016 | Siddiqui | |
| 9,575,515 B2 * | 2/2017 | Leon | H05K 5/0234 |
| 9,752,361 B2 * | 9/2017 | Park | E05D 11/1007 |
| 9,803,409 B2 * | 10/2017 | Lee | H04N 1/00554 |
| 9,822,567 B1 * | 11/2017 | Lin | G06F 1/166 |
| 9,823,706 B2 * | 11/2017 | Chen | E05D 3/02 |
| 9,864,415 B2 | 1/2018 | Siddiqui | |
| 9,983,627 B1 * | 5/2018 | Pelissier | G06F 1/1681 |
| 10,066,429 B2 * | 9/2018 | Park | E05D 1/04 |
| 10,216,223 B2 | 2/2019 | Hsu et al. | |
| 10,221,898 B2 * | 3/2019 | Castillo | F16M 11/2021 |
| 10,309,137 B2 | 6/2019 | Wu et al. | |
| 10,337,229 B2 * | 7/2019 | Beattie | E05F 3/20 |
| 10,344,797 B2 | 7/2019 | Park | |
| 10,358,853 B2 * | 7/2019 | Tomky | F16M 11/38 |
| 10,545,540 B2 * | 1/2020 | Wendt | G06F 1/1681 |
| 10,551,880 B1 * | 2/2020 | Ai | H04M 1/022 |
| 10,597,203 B1 * | 3/2020 | Chang | B65D 43/24 |
| 2009/0293230 A1 * | 12/2009 | Hung | E05D 11/1014 |
| | | | 16/343 |
| 2010/0259876 A1 * | 10/2010 | Kim | G06F 1/166 |
| | | | 361/679.01 |
| 2011/0189008 A1 * | 8/2011 | Brunt | F01D 9/042 |
| | | | 415/209.3 |
| 2014/0293534 A1 | 10/2014 | Siddiqui | |
| 2015/0192965 A1 * | 7/2015 | Chang | G06F 1/1681 |
| | | | 361/679.56 |
| 2017/0003719 A1 | 1/2017 | Siddiqui | |
| 2018/0335808 A1 * | 11/2018 | Tomky | G06F 1/166 |
| 2018/0335809 A1 * | 11/2018 | Wu | E05D 11/10 |
| 2021/0112672 A1 * | 4/2021 | Cazalet | H04R 1/1025 |

* cited by examiner

SYSTEMS AND METHODS FOR ELECTRONIC DEVICES WITH INTEGRATED SUPPORT

BACKGROUND

Background and Relevant Art

Electronic devices are relied upon for personal and professional life to a greater extent each passing year. The ability to carry a powerful and versatile electronic device easily and comfortably has become a paramount feature of many electronic device designs.

BRIEF SUMMARY

In some embodiments, a hinge device for supporting an electronic device includes a first portion and a second portion movable relative to the first portion with a biasing element supported by one or the first portion or the second portion. The first portion has an arcuate groove, and the second portion has an arcuate rail configured to complementarily mate with the arcuate groove and slide therein. The biasing element contacts a leading edge of the other of the first portion or second portion, and the first portion and second portion are bistable in a closed state relative to one another and an open state relative to one another based at least partially on a surface profile of the biasing element applying a radial force to the leading edge.

This Summary is provided to introduce a selection of concepts in a simplified form that are further described below in the Detailed Description. This Summary is not intended to identify key features or essential features of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 4-1 is a side cross-sectional view of a hinge in a closed state, according to at least some embodiments of the present disclosure;

FIG. 4-2 is a side cross-sectional view of the hinge of FIG. 4-1 in an open state, according to at least some embodiments of the present disclosure;

DETAILED DESCRIPTION

The present disclosure relates generally to systems and methods for supporting an electronic device with an integrated support. More particularly, the present disclosure relates to supporting an electronic device with a thin and lightweight support that is hinged to the chassis of the device. The hinge allows the support to rotate outward, relative to the chassis, to form a stand that supports the electronic device on a surface. The support may support the electronic device with a display oriented toward a user in a comfortable position.

In some embodiments, the hinge has two stable positions. The hinge allows for a closed state and an open state of the support, in which the support will be biased into one state or the other. A bistable hinge, therefore, may provide a torque around the rotational axis of the hinge to hold the support in a closed state against the chassis of the electronic device when the hinge is in the closed state. The bistable hinge also provides a torque to hold the support in an open state at a predetermined angle relative to the chassis of the electronic device when the hinge is in the open state.

Some embodiments of a bistable hinge according to the present disclosure provide a proportionately high amount of torque in a compact package. In at least one embodiment, a bistable hinge has a height or thickness less than 1.5 millimeters and produces at least 23 Newton-millimeters of torque. A thin or compact hinge can provide more space in the chassis for electronic components and/or more useable space in the chassis by intruding into the interior volume less. For example, many electronic components for mobile electronic devices flat and thin, such as hardware storage devices, processors, communication devices, etc. However, many components that are thin also have a relatively large area, which can require an uninterrupted interior volume to fit the components into the chassis. A low-profile hinge can, therefore, allow greater freedom in component selection and architecture design for electronic devices. In some embodiments, a bistable hinge according to the present disclosure provides a hinge mechanism that has a vertical thickness that is equal to or less than that of the chassis housing, meaning the hinge adds no additional thickness to the chassis, nor intrudes into the interior volume.

Figure 1:
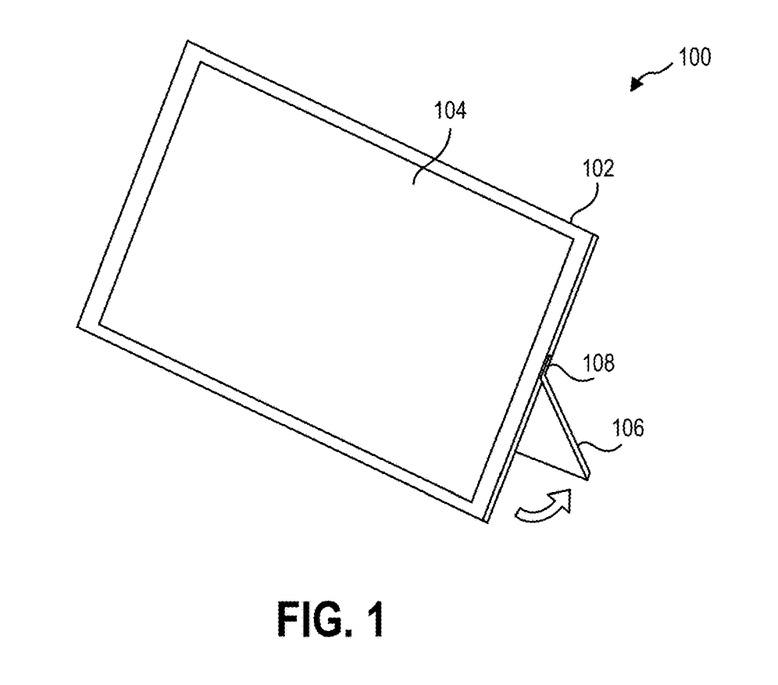
FIG. 1 is a perspective view of an electronic device with an integrated support, according to at least some embodiments of the present disclosure.

An example of an electronic device 100 including a bistable hinge according to the present disclosure is a tablet computer, as illustrated in FIG. 1. In other embodiments, the electronic device may be a personal electronic device, such as a smartphone, or a mobile display device, such as a travel monitor or other display. In some embodiments, the electronic device 100 has a support 106 connected to a rear surface of a chassis 102 opposite a display device 104. The support 106 is connected to the chassis 102 by a support hinge 108. The support hinge 108 may be bistable with a closed state positioning the support 106 flat against the rear surface of the chassis 102. In the closed state, the support 106 may form a substantially flat back to the electronic device 100.

In the open state, the support hinge 108 holds the support 106 at a predetermined angle relative to the rear surface of the chassis 102. The open state supports the electronic device 100 with the display device 104 oriented toward a user relative to a surface upon which the electronic device 100 rests. For example, assuming the electronic device 100 is resting on a horizontal surface, the open state holds the support 106 at an angle relative to the chassis 102 that is twice the desired orientation of the electronic device 100 from vertical. In other words, an open state of the hinge 108 that holds the support 106 at 90° from the chassis 102 orients the display device 104 at 45° from vertical to aim the display device 104 at a user. For most users, a comfortable viewing angle for a tabletop or desktop device is approximately 10° to 30°. Therefore, a hinge 108 according to the present disclosure may have an open angle between approximately 20° and 60°. While a bistable hinge is described herein, additional stable states may be possible with additional detents, as will be described herein.

Figure 2:
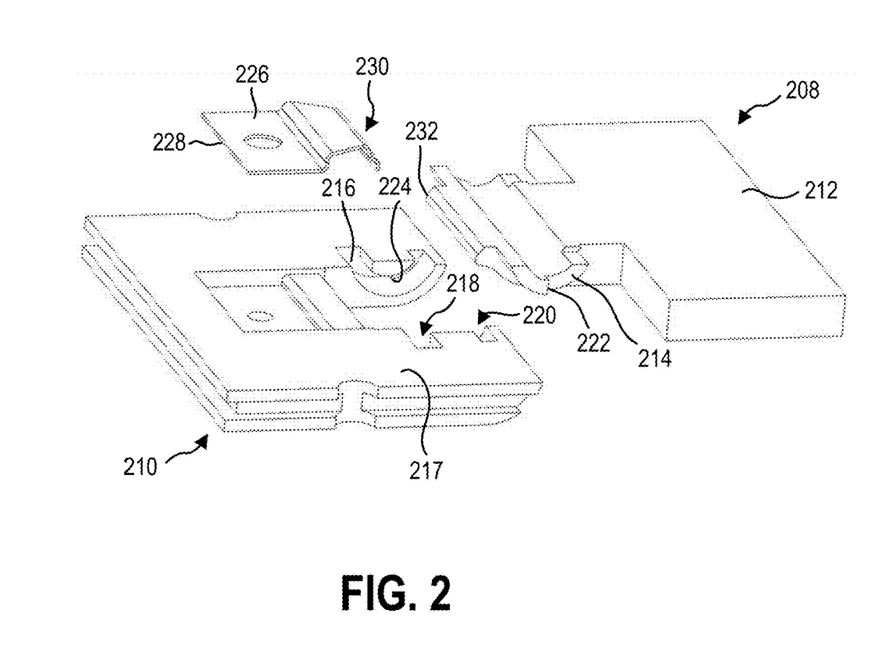
FIG. 2 is an exploded view of a hinge, according to at least some embodiments of the present disclosure.

Referring now to FIG. 2, a support hinge 208, in some embodiments, is thin to minimize intrusion into the interior volume of the chassis while providing no protruding features in the closed state. The hinge 208 includes a first portion 210 and a second portion 212 that are rotatable relative to one another via complementary rails and grooves. The arcuate rails 214 slide within arcuate grooves 216 to create rotation of the hinge 208 around a virtual pivot point that is located above an upper surface 217 of the hinge 208.

In some embodiments, the first portion 210 is connected to one of the chassis or the support of the electronic device (such as chassis 102 or support 106 described in relation to FIG. 1). In some embodiments, the second portion 212 is connected to other of the chassis or the support of the electronic device. In some embodiments, the first portion 210 is integrally formed with one of the chassis or the support of the electronic device. In some embodiments, the second portion 212 is integrally formed with the other of the chassis or the support of the electronic device. For example, the first portion 210 may include indentions, grooves, rails, slots, pins, or other mechanical interlocking features to mechanically interlock with a complementary feature of the chassis, thereby connecting the first portion 210 to the chassis. In another example, the first portion 210 is a machined or cast portion of the chassis with a recess and/or arcuate grooves 216 or rails 214 to receive the second portion 212. In such an example, the first portion 210 of the hinge 208 is the chassis.

The second portion 212 may include indentions, grooves, rails, slots, pins, or other mechanical interlocking features to mechanically interlock with a complementary feature of the support, thereby connecting the second portion 212 to the support. In another example, the second portion 212 is a machined or cast portion of the support with a recess and/or arcuate grooves 216 or rails 214 to receive the first portion 210. In such an example, the second portion 212 of the hinge 208 is the support.

In some embodiments, the first portion 210 and second portion 212 are discrete pieces that connect to the chassis and support to facilitate assembly of the hinge prior to installation in the electronic device. The hinge 208 may assemble by sliding a portion of the arcuate rails 214 into the arcuate grooves 216 through an open end 218 of the arcuate grooves 216. In some embodiments, the arcuate grooves 216 include a closed end 220 that contacts a rotational surface 222 of the arcuate rails 214 to capture the arcuate rails 214. In some embodiments, the contact of the rotational surface 222 of the arcuate rails 214 and the rotational surface 224 of the closed end 220 of the arcuate grooves 216 limits the rotational range of motion of the hinge 208.

The rotational range of motion may be limited to the open angle (e.g., the angle of the hinge in the open state) of the hinge 208. In some instances, the rotational range of motion may be farther than the stable open state to allow some rotational motion beyond the open state and cushion the deceleration of the hinge upon stabilizing in the open state. The arcuate grooves 216 may be located in the first portion 210, and the arcuate rails 214 may be located in the second portion 212. In other examples, the arcuate grooves may be located in the second portion, and the arcuate rails may be located in the first portion.

Figure 3:
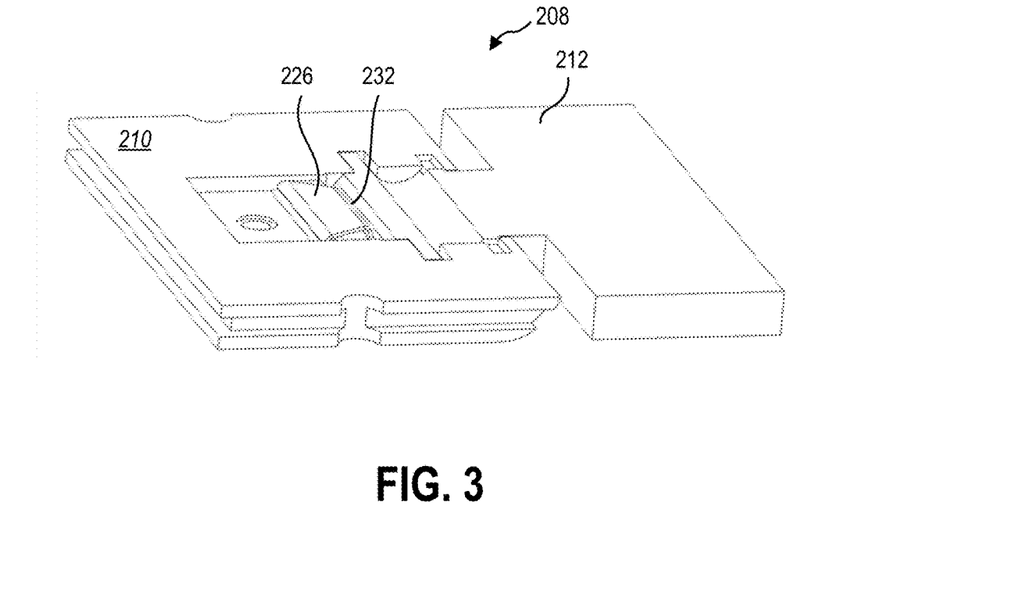
FIG. 3 is an assembled perspective view of the hinge of FIG. 2, according to at least some embodiments of the present disclosure.

In some embodiments, a biasing element 226 is fixed at a first end 228 to the first portion 210, and a second end 230 of the biasing element 226 acts upon a leading edge 232 of the second portion 212. FIG. 3 is an assembled perspective view of the hinge 208 of FIG. 2. In some embodiments, the biasing element is fixed to the second portion and acts upon a leading edge of the first portion. For the purposes of description, the biasing element will be described herein as fixed to the first portion. The biasing element 226 applies a force to the leading edge 232 of the second portion 212 with at least a portion of the force including a radial component relative to the rotational axis of the hinge.

Figure 5:
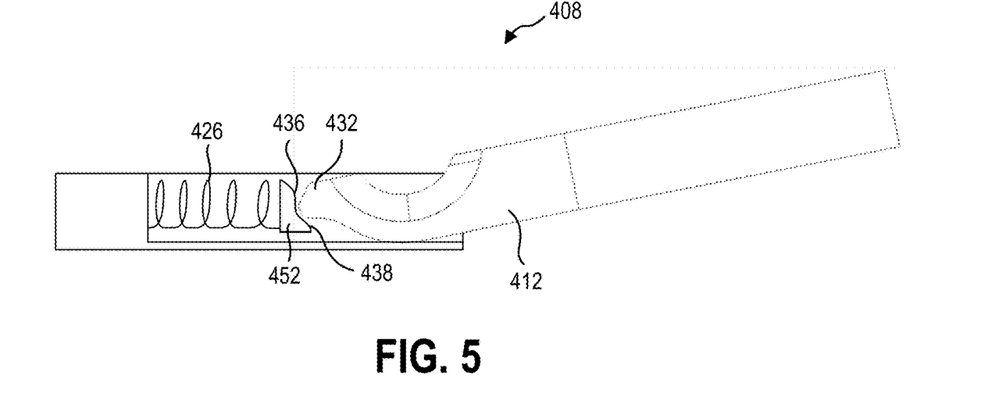
FIG. 5 is a side cross-sectional view of a hinge with a coil spring biasing element, according to at least some embodiments of the present disclosure.
Figure 41:
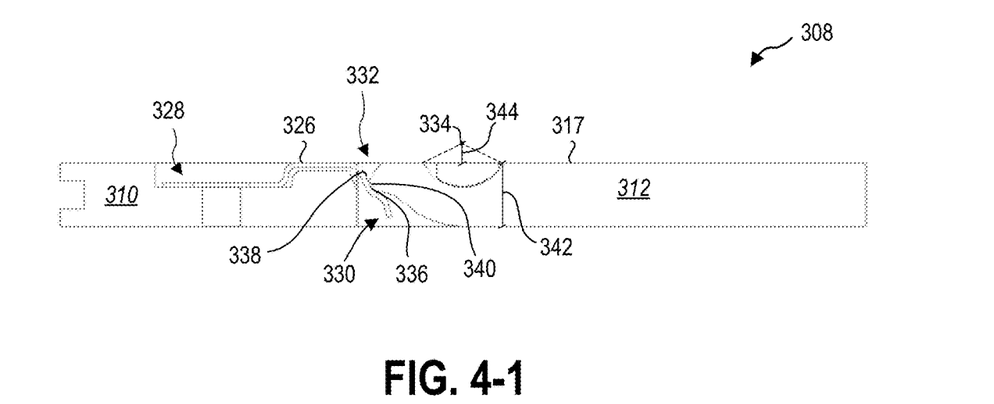
Figure 42:
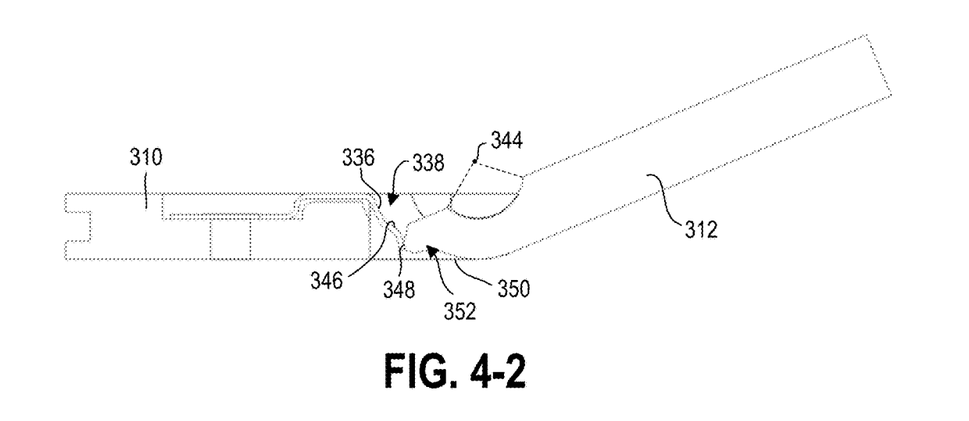

FIG. 4 and FIG. 5 are side cross-sectional views of another embodiment of a hinge 308. The hinge 308 has a virtual pivot 334 positioned above an upper surface 317 of the hinge 308. In some embodiments, the second portion may include one or more detents into which a leading edge of the biasing element may rest. In some embodiments, the radial component of the force from the biasing element 326 urges the leading edge 332 of the second portion 312 to rest in a detent 336 of the biasing element 326. For example, the biasing element 326 may include a surface profile 338 at the second end 330 of the biasing element 326 that includes at least one detent 326 in the radial direction relative to the pivot point 334. The surface profile 338 can include contours in the radial direction to allow a rounded protrusion 340 on the leading edge 332 of the second portion 312 to stabilize in the closed state and in the open state. By applying force in the radial direction, the biasing element 326 can assist the leading edge 332 of the second portion 312 to stabilize in the closed state and in the open state without applying a torque to the second portion 312 to rotate the second portion 312 around the rotational axis. For example, the biasing element 326 may be a leaf spring that is affixed to the first portion 310 at a first end 328, and the second end 330 may be free to deflect in the radial direction as the second portion 312 rotates around the rotational axis at the pivot point 334. In some embodiments, the leaf spring biasing element 326 includes spring steel to provide high elastic forces and durability in a compact geometry. For example, a 1.5 millimeter thick hinge with a spring steel biasing element 326 may produce at least 20 Newton-millimeters of torque.

In some embodiments, an opening torque (e.g., the amount of torque needed to move the hinge from a closed state to an open state) is greater than a closing torque (e.g., the amount of torque needed to move the hinge from a closed state to an open state). A greater opening torque may cause the hinge to remain in a closed state, such as the support staying flush against the back of a tablet computer, to prevent unintended opening of the support. Conversely, the closing torque being lower than the opening torque may allow a user to more easily close the hinge (and stow the support) while picking up the electronic device to either store or move the electronic device. In at least one embodiment, the closing torque is at least 10% less than the opening torque. In at least one embodiment, the closing torque is at least 20% less than the opening torque.

In some embodiments, the rotational axis of the hinge 308 is a virtual pivot point 334 located above an upper surface 317 of the hinge 308. A hinge 308, according to the present disclosure, has a height 342 of less than 2 millimeters. In some embodiments, the hinge 308 has a height 342 less than 1.75 millimeters. In some embodiments, the hinge 308 has a height 342 less than 1.6 millimeters. In some embodiments, the hinge 308 has a height 342 less than 1.5 millimeters. The pivot height 344 of the rotational axis at the virtual pivot 334 may be at least 0.4 millimeters above the upper surface 317 of the hinge 308. In some embodiments, the pivot height 344 is at least 0.5 millimeters.

In some embodiments, a virtual pivot ratio (i.e., the pivot height 344 relative to the hinge height 342) is greater than 0.2. In some embodiments, the virtual pivot ratio is greater than 0.25. In some embodiments, the virtual pivot ratio is greater than 0.3. In some embodiments, the virtual pivot ratio is at least 0.33. For example, a hinge 308, according to the present disclosure, may have a height 342 of 1.5 millimeters and a pivot height 344 of 0.5 millimeters. By moving the pivot point 334 higher relative to the thickness of the hinge, the radius of the arcuate rails and grooves can be increased. Increasing the radius of the arcuate rails and grooves can allow the leading edge 332 of the second portion 312 to move a greater distance across the surface profile 338 of the biasing element 326, producing greater torque and greater stability.

Referring now to FIG. 4, as the second portion 312 slides in the arcuate grooves and rotates around the virtual pivot 344, the leading edge 332 applies a force to the biasing element 326. The leading edge 332 slides across the surface profile 338 of the biasing element 326 with an increasing amount of torque needed to overcome the torque resisting the exit from the closed state detent 336 until the leading edge 332 crosses a ridge 346 in the surface profile 338. The radial force of the biasing element 326 then applies a force to the leading edge 332 of the second portion 312 to urge the second portion 312 to continue rotating toward the open state. In some embodiments, the biasing element 326 has an open state detent (i.e., a second detent) in the surface profile 338. In some embodiments, the biasing element 326 has a sloped portion 348 of the surface profile 338 that terminates at or near a lower surface 350 of the hinge 308, where the leading edge 332 of the second portion 312 contacts a portion of the chassis. In such embodiments, a second detent is formed between the lower surface 350 of the hinge and the sloped portion 348 of the surface profile 338.

While embodiments of hinges including a leaf spring biasing element have been described herein, other biasing elements may be used. In some embodiments, such as that illustrated in FIG. 5, the biasing element 426 is a coil spring oriented substantially parallel to the upper surface 417 of the hinge 408 to apply a force to the leading edge 432 of the second portion 412. The leaf spring biasing element (such as the leaf spring biasing element described in relation to FIG. 3) may be stamped or otherwise plastically deformed metal or other resilient material that has a surface profile formed in the biasing element. A leaf spring element may be manufactured very thin to reduce the thickness of the device. In some embodiments, a coil spring biasing element 426 may apply a force to an endpiece 452 that has a surface profile 438 oriented toward and contacting the leading edge 432 of the second portion 412. The surface profile 438 may be similar to that described in relation to the leaf spring biasing element. For example, the surface profile 438 of the endpiece 452 may have at least one detent 436 to stabilize the second portion 412 at a predetermined rotational position.

Figure 6:
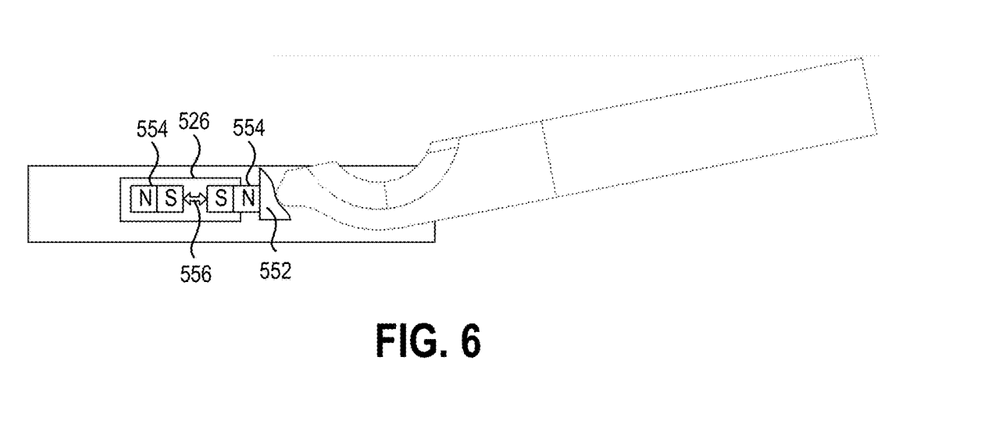
FIG. 6 is a side cross-sectional view of a hinge with a magnetic biasing element, according to at least some embodiments of the present disclosure.

In other examples, the biasing element includes other mechanisms to apply a radial force to the leading edge of the second portion. As illustrated in FIG. 6, in some embodiments, the biasing element 526 includes one or more magnets 554 that are oriented to create a repulsive magnetic force 556 therebetween. For example, the magnets 554 may be oriented with the same magnetic poles toward one another, producing a repulsive magnetic force 556 that applies a force to the endpiece 552. In other embodiments, the biasing element includes a compressible gas chamber that applies a force to the endpiece through a piston and/or cylinder. In some embodiments, a magnetic biasing element 526 prevents fatigue and failure that may occur with a coil or leaf spring.

As described herein, the surface profile of the biasing element, either the shape of the leaf spring or the endpiece on other biasing elements, may affect the torque produced when moving the second portion relative to the first portion. In some embodiments, the torque profile is relative to the shape of the surface profile. In some embodiments, the torque profile is based at least partially on the radial force produced by the biasing element throughout the range of motion of the second portion.

Figure 7:
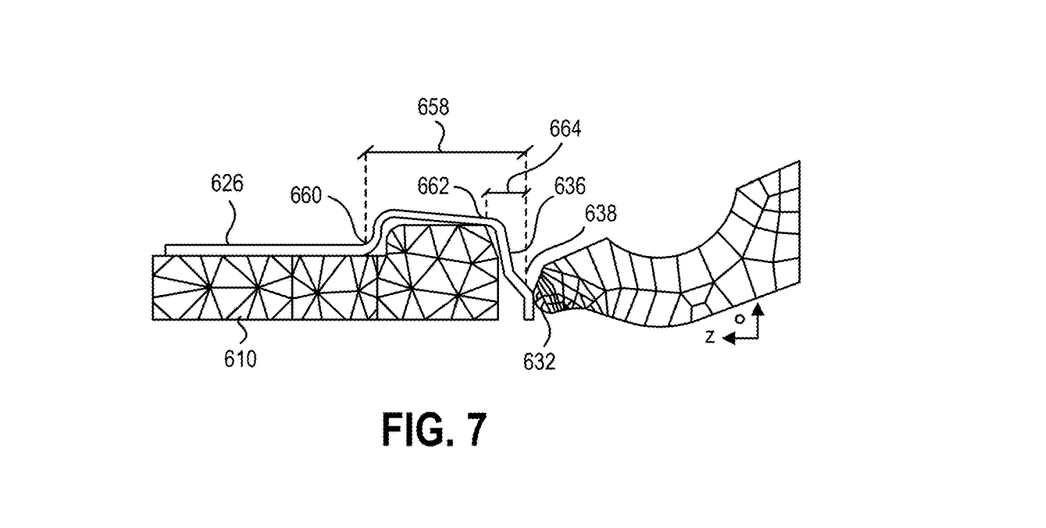
FIG. 7 is a side cross-sectional view of a hinge illustrating elastic deformation of the biasing element, according to at least some embodiments of the present disclosure.

For example, the more the biasing element is compressed and/or elastically deformed, the greater the force generated by the biasing element. In another example, the leaf spring may have at least two force regimes based at least partially on the nearest anchor point to the contact point with the leading edge of the second portion. Referring now to the example illustrated in FIG. 7, during the initial movement of the leading edge 632 from the first detent 636 (e.g., the closed state), the leaf spring biasing element 626 is anchored to the rear of the first portion 610. When elastically bending from the rear of the first portion 610, the first lever arm 658 is long and the first lever arm 658 bends downward around a first pivot 660 with a first amount of force. As the leaf spring biasing element 626 continues to bend downward, the leaf spring biasing element 626 contacts a second pivot 662 the front of the first portion 610. The lever arm shortens to the second lever arm 664, and the biasing element 626 generates a larger force in resistance of further movement by the leading edge 632 downward on the surface profile 638 of the biasing element 626.

Figure 8:
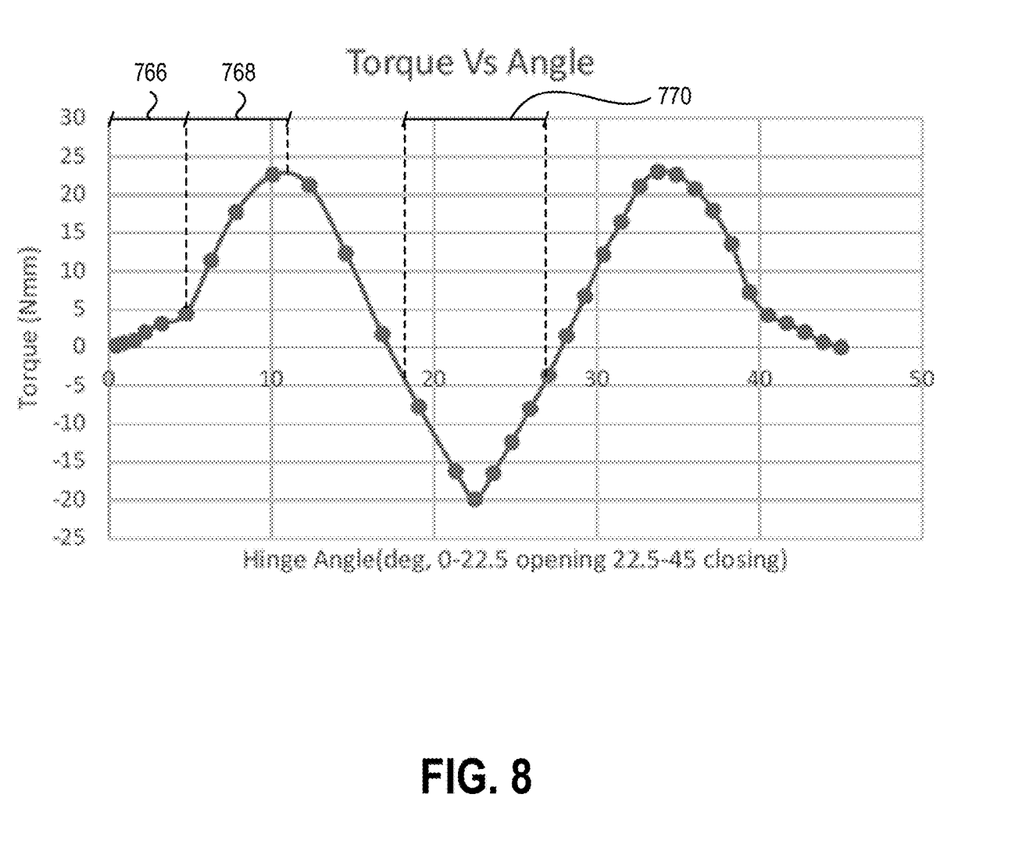
FIG. 8 is a torque curve of a bistable hinge, according to at least some embodiments of the present disclosure.

A torque profile of the torque generated by the hinge, shown in FIG. 8, reflects the first torque region 766 where the biasing element provides a first force initially from the closed state. After contacting the first portion with the bent biasing element, the amount of torque increases in a second torque region 768, producing an inflection point in the torque profile. Finally, the torque decreases and changes direction in a torque well 770 as the leading edge of the second portion crosses the ridge in the surface profile and moves toward the open state. The torque well 770 then urges the second portion toward the open state to snap the support of the electronic device open. Because the torque well 770 urges the second portion toward the open state and resists movement of the second portion toward the closed state, the hinge holds the support in the open state.

In some embodiments, the amount of force applied by the biasing element may be further adjusted by use of shape memory materials, such as shape memory alloys or shape memory polymers. For example, a shape memory material bar, wire, sheet, or spring may change length, shape, or elastic modulus based at least partially on the application of electrical current to the shape memory material. In some embodiments, the hinge requires a greater amount of torque to move the hinge from the closed state to the open state than is required to move the hinge from the open state to the closed state.

Figure 9:
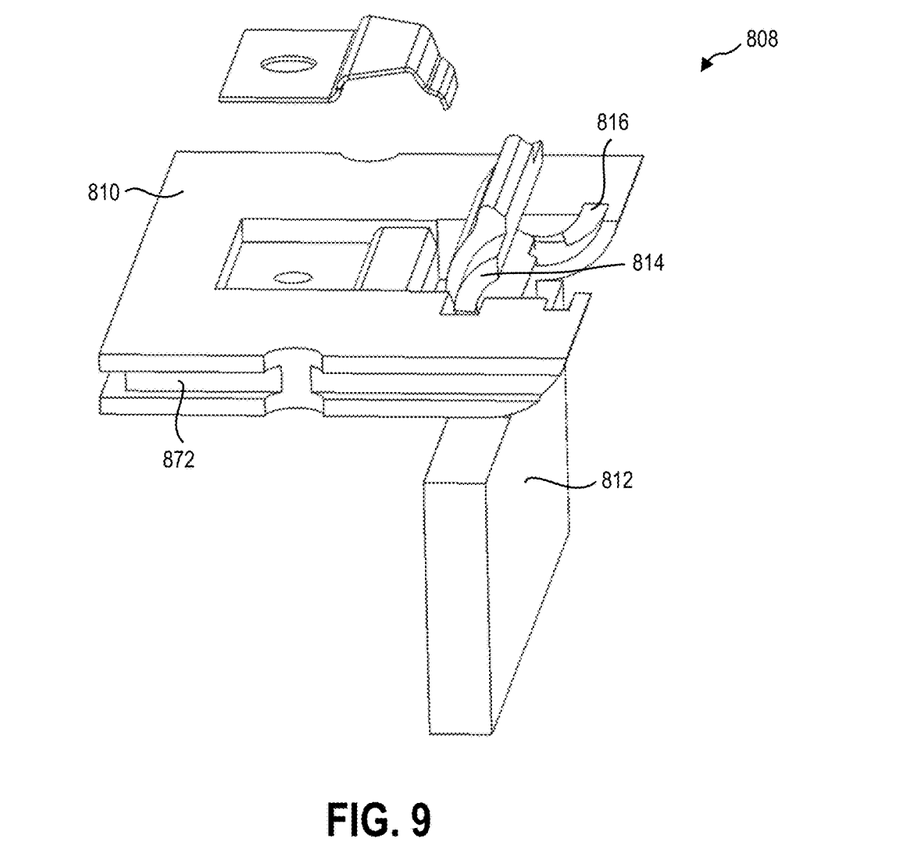
FIG. 9 is a perspective view of an assembly process of a hinge, according to at least some embodiments of the present disclosure.

A hinge according to the present disclosure may provide additional benefits in assembly and installation. For example, the arcuate rails and grooves may allow the first portion 810 and second portion 812 to be assembled by simply inserting the arcuate rails 814 into the grooves 816, as shown in FIG. 9. There is no additional axle or other rotational mechanism needed to support the hinge. Arcuate grooves 816 with closed ends limit the movement of the second portion 812 in the open direction. After the hinge 808 is installed in or connected to the chassis, the chassis, itself, limits the movement of the second portion 812 in the closed direction, preventing the disassembly of the hinge 808.

Figure 10:
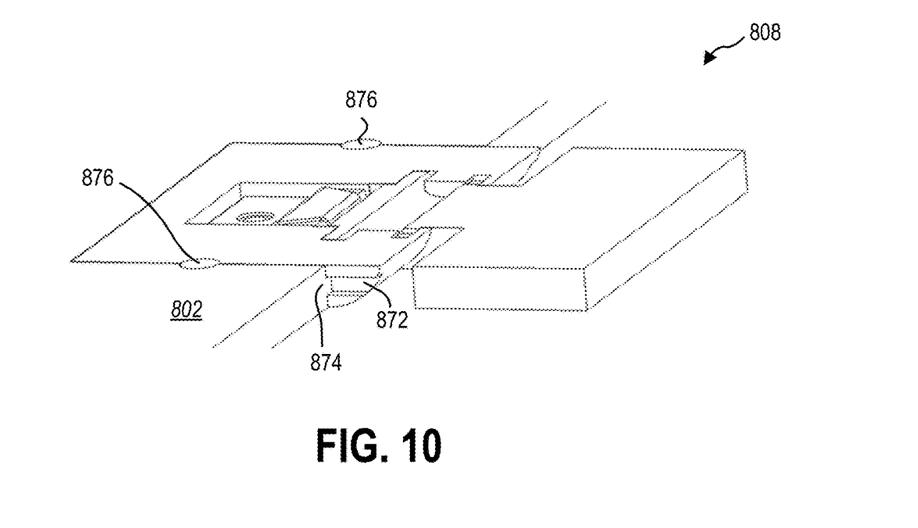
FIG. 10 is a perspective view of a hinge connected to a chassis of an electronic device, according to at least some embodiments of the present disclosure.

In some embodiments, the first portion and/or the second portion of the hinge includes longitudinal grooves 872 or slots that allow the hinge 808 to slide into place in the chassis. The grooves 872 allow the first portion 810, as shown in FIG. 10, to slide along complementary rails 874 machined into a side surface of the chassis between an outer surface of the chassis 802 and the inner surface of the chassis 802. Pins 876 may be inserted into the seam between the chassis 802 and the hinge 808 to lock the hinge 808 in place and retain the hinge 808 in the chassis 802. In some embodiments, a similar connection mechanism may be used between the second portion and the support. A longitudinal connection mechanism between the hinge and the chassis can limit the overall height of the hinge connected to the chassis by eliminating layering the hinge on a surface of the chassis, thereby minimizing the intrusion into the interior volume of the chassis and providing a flat back surface to the electronic device.

A hinge according to the present disclosure provides a relatively high amount of torque to hold the support closed in a closed state and open in an open state, while requiring less thickness in the hinge and/or in the connection to the chassis than conventional hinges. A low-profile bistable hinge enables, therefore, thinner electronic devices and more flexibility in selection and arrangement of components.

INDUSTRIAL APPLICABILITY

The present disclosure relates generally to systems and methods for supporting an electronic device with an integrated support. More particularly, the present disclosure relates to supporting an electronic device with a thin and lightweight support that is hinged to the chassis of the device. The hinge allows the support to rotate outward, relative to the chassis, to form a stand that supports the electronic device on a surface. The support may support the electronic device with a display oriented toward a user in a comfortable position.

In some embodiments, the hinge has two stable positions. The hinge allows for a closed state and an open state of the support, in which the support will be biased into one state or the other. A bistable hinge, therefore, may provide a torque around the rotational axis of the hinge to hold the support in a closed state against the chassis of the electronic device when the hinge is in the closed state. The bistable hinge also provides a torque to hold the support in an open state at a predetermined angle relative to the chassis of the electronic device when the hinge is in the open state.

Some embodiments of a bistable hinge according to the present disclosure provide a proportionately high amount of torque in a compact package. In at least one embodiment, a bistable hinge has a height or thickness less than 1.5 millimeters and produces 23 Newton-millimeters of torque. A thin or compact hinge can provide more space in the chassis for electronic components and/or more useable space in the chassis by intruding into the interior volume less. For example, many electronic components for mobile electronic devices flat and thin, such as hardware storage devices, processors, communication devices, etc. However, many components that are thin also have a relatively large area, which can require an uninterrupted interior volume to fit the components into the chassis. A low-profile hinge can, therefore, allow greater freedom in component selection and architecture design for electronic devices. In some embodiments, a bistable hinge according to the present disclosure provides a hinge mechanism that has a vertical thickness that is equal to or less than that of the chassis housing, meaning the hinge adds no additional thickness to the chassis, nor intrudes into the interior volume.

In some embodiments, an opening torque (e.g., the amount of torque needed to move the hinge from a closed state to an open state) is greater than a closing torque (e.g., the amount of torque needed to move the hinge from a closed state to an open state). A greater opening torque may cause the hinge to remain in a closed state, such as the support staying flush against the back of a tablet computer, to prevent unintended opening of the support. Conversely, the closing torque being lower than the opening torque may allow a user to more easily close the hinge (and stow the support) while picking up the electronic device to either store or move the electronic device. In at least one embodiment, the closing torque is at least 10% less than the opening torque. In at least one embodiment, the closing torque is at least 20% less than the opening torque.

An example of an electronic device including a bistable hinge according to the present disclosure is a tablet computer. In other embodiments, the electronic device may be a personal electronic device, such as a smartphone, or a mobile display device, such as a travel monitor or other display. In some embodiments, the electronic device has a support connected to a rear surface of a chassis opposite a display device. The support is connected to the chassis by a support hinge. The support hinge may be bistable with a closed state positioning the support flat against the rear surface of the chassis. In the closed state, the support may form a substantially flat back to the electronic device.

In the open state, the support hinge holds the support at a predetermined angle relative to the rear surface of the chassis. The open state supports the electronic device with the display device oriented toward a user relative to a surface upon which the electronic device rests. For example, assuming the electronic device is resting on a horizontal surface, the open state holds the support at an angle relative to the chassis that is twice the desired orientation of the electronic device from vertical. In other words, an open state of the hinge that holds the support at 90° from the chassis orients the display device at 45° from vertical to aim the display device at a user. For most users, a comfortable viewing angle for a tabletop or desktop device is approximately 10° to 30°. Therefore, a hinge according to the present disclosure may have an open angle between approximately 20° and 60°. While a bistable hinge is described herein, additional stable states may be possible with additional detents, as will be described herein.

As described herein, a support hinge, in some embodiments, is thin to minimize intrusion into the interior volume of the chassis while providing no protruding features in the closed state. The hinge includes a first portion and a second portion that are rotatable relative to one another via complementary rails and grooves. The arcuate rails slide within arcuate grooves to create rotation of the hinge around a virtual pivot point that is located above an upper surface of the hinge.

In some embodiments, the first portion is connected to one of the chassis or the support of the electronic device. In some embodiments, the second portion is connected to other of the chassis or the support of the electronic device. In some embodiments, the first portion is integrally formed with one of the chassis or the support of the electronic device. In some embodiments, the second portion is integrally formed with the other of the chassis or the support of the electronic device. For example, the first portion may include indentions, grooves, rails, slots, pins, or other mechanical interlocking features to mechanically interlock with a complementary feature of the chassis, thereby connecting the first portion to the chassis. In another example, the first portion is a machined or cast portion of the chassis with a recess and/or arcuate grooves or rails to receive the second portion. In such an example, the first portion of the hinge is the chassis.

The second portion may include indentions, grooves, rails, slots, pins, or other mechanical interlocking features to mechanically interlock with a complementary feature of the support, thereby connecting the second portion to the support. In another example, the second portion is a machined or cast portion of the support with a recess and/or arcuate grooves or rails to receive the first portion. In such an example, the second portion of the hinge is the support.

In some embodiments, the first portion and second portion are discrete pieces that connect to the chassis and support to facilitate assembly of the hinge prior to installation in the electronic device. The hinge may assemble by sliding a portion of the arcuate rails into the arcuate grooves through an open end of the arcuate grooves. In some embodiments, the arcuate grooves include a closed end that contacts a rotational surface of the arcuate rails to capture the arcuate rails. In some embodiments, the contact of the rotational surface of the arcuate rails and the rotational surface of the closed end of the arcuate grooves limits the rotational range of motion of the hinge.

The rotational range of motion may be limited to the open angle (e.g., the angle of the hinge in the open state) of the hinge. In some instances, the rotational range of motion may be farther than the stable open state to allow some rotational motion beyond the open state and cushion the deceleration of the hinge upon stabilizing in the open state. The arcuate grooves may be located in the first portion, and the arcuate rails may be located in the second portion. In other examples, the arcuate grooves may be located in the second portion, and the arcuate rails may be located in the first portion.

In some embodiments, a biasing element is fixed at a first end to the first portion, and a second end of the biasing element acts upon a leading edge of the second portion. In some embodiments, the biasing element is fixed to the second portion and acts upon a leading edge of the first portion. For the purposes of description, the biasing element will be described herein as fixed to the first portion. The biasing element applies a force to the leading edge of the second portion with at least a portion of the force including a radial component relative to the rotational axis of the hinge.

In some embodiments, the leading edge of the second portion may include one or more detents into which a leading edge of the biasing element may rest. In some embodiments, the radial component of the force urges the leading edge of the second portion to rest in the detent of the biasing element. For example, the biasing element may include a surface profile at the second end of the biasing element that includes at least one detent in the radial direction. The surface profile can include contours in the radial direction to allow the leading edge of the second portion to stabilize in the closed state and in the open state. By applying force in the radial direction, the biasing element can assist the leading edge of the second portion to stabilize in the closed state and in the open state without applying a torque to the second portion to rotate the second portion around the rotational axis. For example, the biasing element may be a leaf spring that is affixed to the first portion at a first end, and the second end may be free to deflect in the radial direction as the second portion rotates around the rotational axis.

In some embodiments, the rotational axis of the hinge is a virtual pivot point located above an upper surface of the hinge. A hinge, according to the present disclosure, has a height of less than 2 millimeters. In some embodiments, the hinge has a height less than 1.75 millimeters. In some embodiments, the hinge has a height less than 1.6 millimeters. In some embodiments, the hinge has a height less than 1.5 millimeters. The pivot height of the rotational axis at the virtual pivot may be at least 0.4 millimeters above the upper surface of the hinge. In some embodiments, the pivot height is at least 0.5 millimeters.

In some embodiments, a virtual pivot ratio (i.e., the pivot height relative to the hinge height) is greater than 0.2. In some embodiments, the virtual pivot ratio is greater than 0.25. In some embodiments, the virtual pivot ratio is greater than 0.3. In some embodiments, the virtual pivot ratio is at least 0.33. For example, a hinge, according to the present disclosure, may have a height of 1.5 millimeters and a pivot height of 0.5 millimeters. By moving the pivot point higher relative to the thickness of the hinge, the radius of the arcuate rails and grooves can be increased. Increasing the radius of the arcuate rails and grooves can allow the leading edge of the second portion to move a greater distance across the surface profile of the biasing element, producing greater torque and greater stability.

As the second portion slides in the arcuate grooves and rotates around the virtual pivot, the leading edge applies a force to the biasing element. The leading edge slides across the surface profile of the biasing element with a greater amount of torque needed to overcome the torque resisting the exit from the closed detent until the leading edge crosses a ridge in the surface profile. The radial force of the biasing element then applies a force to the leading edge of the second portion to urge the second portion to continue rotating toward the open state. In some embodiments, the biasing element has an open detent (i.e., a second detent) in the surface profile. In some embodiments, the biasing element has a sloped portion of the surface profile that terminates at or near a lower surface of the hinge, where the leading edge of the second portion contacts a portion of the chassis. In such embodiments, a second detent is formed between the lower surface of the hinge and the sloped portion of the surface profile.

While embodiments of hinges including a leaf spring biasing element have been described herein, other biasing elements may be used. In some embodiments, the biasing element is a coil spring oriented substantially parallel to the upper surface of the hinge to apply a force to the leading edge of the second portion. The leaf spring biasing element may be stamped or otherwise plastically deformed metal or other resilient material that has a surface profile formed in the biasing element. A coil spring may apply a force to an endpiece that has a surface profile oriented toward and contacting the leading edge of the second portion. The surface profile may be similar to that described in relation to the leaf spring biasing element. For example, the surface profile of the endpiece may have at least one detent to stabilize the second portion at a predetermined rotational position.

In other examples, the biasing element includes other mechanisms to apply a radial force to the leading edge of the second portion. In some embodiments, the biasing element includes one or more magnets that are oriented to create a repulsive force. For example, the magnets may be oriented with the same magnetic poles toward one another, producing a repulsive magnetic force that applies a force to the endpiece. In other embodiments, the biasing element includes a compressible gas chamber that applies a force to the endpiece through a piston and/or cylinder.

As described herein, the surface profile of the biasing element, either the shape of the leaf spring or the endpiece on other biasing elements, may affect the torque produced when moving the second portion relative to the first portion. In some embodiments, the torque profile is relative to the shape of the surface profile. In some embodiments, the torque profile is based at least partially on the radial force produced by the biasing element throughout the range of motion of the second portion.

For example, the more the biasing element is compressed and/or elastically deformed, the greater the force generated by the biasing element. In another example, the leaf spring may have at least two force regimes based at least partially on the nearest anchor point to the contact point with the leading edge of the second portion. For example, during the initial movement of the leading edge from the first detent (e.g., the closed state), the leaf spring biasing element is anchored to the rear of the first portion. When elastically bending from the rear of the first portion, the lever arm is long and the arm bends downward with a first amount of force. As the leaf spring biasing element continues to bend downward, the leaf spring biasing element contacts the front of the first portion. The lever arm shortens, and the biasing element generates a larger force in resistance of further movement by the leading edge downward on the surface profile of the biasing element.

A torque profile of the torque generated by the hinge reflects the first force regime where the biasing element provides a first force initially from the closed state. After contacting the first portion with the bent biasing element, the amount of torque increases, producing an inflection point in the torque profile. Finally, the torque decreases and changes direction as the leading edge of the second portion crosses the ridge in the surface profile and moves toward the open state. The torque then urges the second portion toward the open state to snap the support of the electronic device open.

In some embodiments, the amount of force applied by the biasing element may be further adjusted by use of shape memory materials, such as shape memory alloys or shape memory polymers. For example, a shape memory material bar, wire, sheet, or spring may change length, shape, or elastic modulus based at least partially on the application of electrical current to the shape memory material.

A hinge according to the present disclosure may provide additional benefits in assembly and installation. For example, the arcuate rails and grooves may allow the first portion and second portion to be assembled by simply inserting the rails into the grooves. There is no additional axle or other rotational mechanism needed to support the hinge. Arcuate grooves with closed ends limit the movement of the second portion in the open direction. After the hinge is installed in or connected to the chassis, the chassis, itself, limits the movement of the second portion in the closed direction, preventing the disassembly of the hinge.

In some embodiments, the first portion and/or the second portion of the hinge includes longitudinal grooves or slots that allow the hinge to slide into place in the chassis. The grooves allow the first portion, for example, to slide along complementary rails machined into the chassis. Pins may be inserted into the seam between the chassis and the hinge to lock the hinge in place and retain the hinge in the chassis. In some embodiments, a similar connection mechanism may be used between the second portion and the support. A longitudinal connection mechanism between the hinge and the chassis can limit the overall height of the hinge connected to the chassis by eliminating layering the hinge on a surface of the chassis, thereby minimizing the intrusion into the interior volume of the chassis and providing a flat back surface to the electronic device.

A hinge according to the present disclosure provides a relatively high amount of torque to hold the support closed in a closed state and open in an open state, while requiring less thickness in the hinge and/or in the connection to the chassis than conventional hinges. A low-profile bistable hinge enables, therefore, thinner electronic devices and more flexibility in selection and arrangement of components.

The present disclosure relates to systems and methods for supporting an electronic device according to at least the examples provided in the sections below:

[A1] In some embodiments, a hinge device for supporting an electronic device includes a first portion and a second portion movable relative to the first portion with a biasing element supported by one or the first portion or the second portion. The first portion has an arcuate groove, and the second portion has an arcuate rail configured to complementarily mate with the arcuate groove and slide therein. The biasing element contacts a leading edge of the other of the first portion or second portion, and the first portion and second portion are bistable in a closed state relative to one another and an open state relative to one another based at least partially on a surface profile of the biasing element applying a radial force to the leading edge.

[A2] In some embodiments, the first portion and second portion of [A1] slide relative to one another on the arcuate rail and arcuate groove around a virtual pivot point.

[A3] In some embodiments, the pivot point of [A2] is a pivot height above an upper surface of both the first portion and second portion. A pivot ratio of the pivot height to a hinge height in the closed state is at least 0.2.

[A4] In some embodiments, the biasing element of any of [A1] through [A3] includes spring steel.

[A5] In some embodiments, the hinge of any of [A1] through [A4] requires at least 20 Newton-millimeters of opening torque to move between the closed state and the open state.

[A6] In some embodiments, the opening torque of [A5] is greater than a closing torque.

[A7] In some embodiments, the hinge of [A5], in a closed state has a thickness less than 2 millimeters.

[A8] In some embodiments, the leading edge of any of [A1] through [A7] includes a rounded radial protrusion.

[A9] In some embodiments, the biasing element of any of [A1] through [A8] includes a leaf spring.

[A10] In some embodiments, the biasing element of any of [A1] through [A8] includes a coil spring.

[A11] In some embodiments, the biasing element of any of [A1] through [A8] includes a magnet.

[A12] In some embodiments, the biasing element of any of [A1] through [A8] includes a shape memory material.

[A13] In some embodiments, the surface profile of any of [A1] through [A12] includes a detent in a radial direction relative to the virtual pivot point.

[A14] In some embodiments, the first end of the arcuate groove of any of [A1] through [A13] is open to allow the arcuate rail to be inserted therein. A second end of the arcuate groove is closed to capture the arcuate rail and limit a range of motion of the rail in a first direction toward the open state.

[A15] In some embodiments, the hinge of any of [A1] through [A14] has a torque profile including a low-torque regime through a first portion of a range of motion from the closed state toward the open state and a high-torque regime through a second portion of the range of motion toward the open state.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the scope of the present disclosure, and that various changes, substitutions, and alterations may be made to embodiments disclosed herein without departing from the scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A hinge device for supporting an electronic device, the hinge comprising:
   a first portion including an arcuate groove;
   a second portion including an arcuate rail configured to complementarily mate with the arcuate groove and slide therein; and
   a biasing element supported by one of the first portion or the second portion and contacting a leading edge of the other of the first portion or second portion, wherein the first portion and second portion are bistable in a closed state relative to one another and an open state relative to one another based at least partially on a surface profile of the biasing element applying a radial force to the leading edge, wherein the surface profile of the biasing element includes a detent in a radial direction relative to the virtual pivot point and configured to contact the leading edge, and wherein a torque generated between the biasing element and the leading edge biases the first portion and the second portion toward either the closed state or the open state.

2. The hinge of claim 1, wherein the first portion and second portion are configured to slide relative to one another on the arcuate rail and arcuate groove around a virtual pivot point.

3. The hinge of claim 2, wherein the virtual pivot point is a pivot height above an upper surface of both the first portion and second portion, and a pivot ratio of the pivot height to a hinge height in the closed state is at least 0.2.

4. The hinge of claim 1, wherein the biasing element includes spring steel.

5. The hinge of claim 1, wherein the hinge requires at least 20 Newton-millimeters of opening torque to move between the closed state and the open state.

6. The hinge of claim 5, wherein the opening torque is greater than a closing torque.

7. The hinge of claim 5, wherein the hinge, in the closed state, has a thickness less than 2 millimeters.

8. The hinge of claim 1, wherein the leading edge includes a rounded radial protrusion.

9. The hinge of claim 1, wherein the biasing element includes a leaf spring.

10. The hinge of claim 1, wherein the biasing element includes a coil spring.

11. The hinge of claim 1, wherein the biasing element includes a magnet.

12. The hinge of claim 1, wherein the biasing element including a shape memory material.

13. The hinge of claim 1, wherein a first end of the arcuate groove is open to allow the arcuate rail to be inserted therein, and a second end of the arcuate groove is closed to capture the arcuate rail and limit a range of motion of the rail in a first direction toward the open state.

14. The hinge of claim 1, wherein the hinge has a torque profile including:
- a low-torque regime through a first portion of a range of motion from the closed state toward the open state, and
- a high-torque regime through a second portion of the range of motion toward the open state.

15. A method of supporting an electronic device with a hinged stand, the method comprising:
- contacting the electronic device with a first portion of the hinge;
- rotating a second portion of the hinge relative to the first portion around a virtual pivot point through a torque profile from a closed state to an open state, wherein the torque profile has a low-torque region through a first portion of a range of motion from the closed state toward the open state and a high-torque region through a second portion of the range of motion toward the open state after the first portion, and wherein the surface profile of a biasing element includes a detent in a radial direction relative to the virtual pivot point and configured to contact the leading edge, and wherein a torque generated between the biasing element and the leading edge biases the first portion and the second portion toward either the closed state or the open state.

16. The method of claim 15, wherein rotating the second portion of the hinge elastically deforms the biasing element around a first pivot through the low-torque region and elastically deforms the biasing element around a second pivot through the high-torque region.

17. The method of claim 15, further comprising stabilizing the second portion in an open state within a torque well of the hinge.

18. An electronic device comprising:
- a chassis having longitudinal rails positioned on a side surface between an outer surface and an inner surface;
- a hinge including:
    - a first portion including an arcuate groove;
    - a second portion including an arcuate rail configured to complementarily mate with the arcuate groove and slide therein; and
    - a biasing element supported by one of the first portion or the second portion and contacting a leading edge of the other of the first portion or second portion, wherein the first portion and second portion are bistable in a closed state relative to one another and an open state relative to one another based at least partially on a surface profile of the biasing element applying a radial force to the leading edge, wherein the surface profile of the biasing element includes a detent in a radial direction relative to the virtual pivot point and configured to contact the leading edge, and wherein a torque generated between the biasing element and the leading edge biases the first portion and the second portion toward either the closed state or the open state;
- wherein the hinge is connected to the chassis with longitudinal grooves in the first portion that complementarily mate with the longitudinal rails, such that an upper surface of the hinge is co-planar with an outer surface of the chassis.

19. The electronic device of claim 18, further comprising pins crossing a seam between the hinge and the chassis to limit movement of the hinge relative to the chassis on the longitudinal rails.

* * * * *